(12) United States Patent
Kolstad et al.

(10) Patent No.: US 9,908,968 B2
(45) Date of Patent: Mar. 6, 2018

(54) POLYESTER AND METHOD FOR PREPARING SUCH A POLYESTER

(71) Applicant: Furanix Technologies B.V., Amsterdam (NL)

(72) Inventors: Jeffrey John Kolstad, Amsterdam (NL); Bing Wang, Amsterdam (NL); Robert Joseph Schiavone, Matthews, NC (US); Marion L. Andrews, Darlington, SC (US); Jesper Gabriël van Berkel, Amsterdam (NL); Edward E. Paschke, Galena, IL (US)

(73) Assignee: Synvina C.V., Amsterdam (NL)

( * ) Notice: Subject to any disclaimer, the term of this patent is extended or adjusted under 35 U.S.C. 154(b) by 0 days.

(21) Appl. No.: 15/123,724

(22) PCT Filed: Mar. 11, 2015

(86) PCT No.: PCT/NL2015/050152
§ 371 (c)(1),
(2) Date: Sep. 6, 2016

(87) PCT Pub. No.: WO2015/137805
PCT Pub. Date: Sep. 17, 2015

(65) Prior Publication Data
US 2017/0015780 A1 Jan. 19, 2017

Related U.S. Application Data

(60) Provisional application No. 61/951,217, filed on Mar. 11, 2014.

(30) Foreign Application Priority Data

Mar. 11, 2014 (NL) ..................................... 2012407

(51) Int. Cl.
C08G 63/16 (2006.01)
C08G 63/181 (2006.01)
C08G 63/80 (2006.01)
C08G 63/86 (2006.01)

(52) U.S. Cl.
CPC ........... C08G 63/16 (2013.01); C08G 63/181 (2013.01); C08G 63/80 (2013.01); C08G 63/866 (2013.01)

(58) Field of Classification Search
CPC ...... C08G 63/88; C08G 63/866; C08G 63/16; C08G 63/80; C08G 63/181
See application file for complete search history.

(56) References Cited

U.S. PATENT DOCUMENTS

| 2,551,731 | A | | 5/1951 | Drewitt | |
|---|---|---|---|---|---|
| 4,622,381 | A | * | 11/1986 | Suzuki | ...................... D01F 6/84 264/103 |
| 8,366,428 | B2 | | 2/2013 | Eloo | |
| 8,420,769 | B2 | | 4/2013 | Eritate | |
| 2004/0091653 | A1 | * | 5/2004 | Tai | ...................... B29C 49/0005 428/35.7 |
| 2007/0155947 | A1 | * | 7/2007 | Fujimori | .............. C08G 63/183 528/272 |
| 2008/0248285 | A1 | * | 10/2008 | Flores | ...................... C08K 3/34 428/324 |
| 2009/0005531 | A1 | * | 1/2009 | Thomspon | .............. C08G 63/80 528/279 |
| 2009/0124763 | A1 | | 5/2009 | Matsuda et al. | |
| 2010/0174044 | A1 | | 7/2010 | Eritate | |

FOREIGN PATENT DOCUMENTS

| KR | 20140003167 A | 1/2014 |
|---|---|---|
| WO | 2010/077133 A1 | 7/2010 |
| WO | 2010/132740 A2 | 11/2010 |
| WO | 2011/043660 A2 | 4/2011 |
| WO | 2011/043661 A1 | 4/2011 |
| WO | 2013/062408 A1 | 5/2013 |
| WO | 2013/120989 A2 | 8/2013 |

* cited by examiner

*Primary Examiner* — Robert Jones, Jr.
(74) *Attorney, Agent, or Firm* — Hoffmann & Baron, LLP

(57) ABSTRACT

A polyester, including ethylene 2,5-furandicarboxylate units, also includes diethylene glycol residues, the content of which is less than 0.045, in moles per mole of 2,5-furandicarboxylate moieties. The polyester composition can be prepared with a method where a starting mixture is subjected to esterification of 2,5-furandicarboxylic acid or transesterification of an ester thereof with ethylene glycol in the presence of a basic compound and/or an ammonium compound capable of suppressing the formation of diethylene glycol.

26 Claims, No Drawings

POLYESTER AND METHOD FOR PREPARING SUCH A POLYESTER

CROSS-REFERENCE TO RELATED APPLICATIONS

This application is the National Stage of International Application No. PCT/NL2015/050152 filed Mar. 11, 2015, which claims the benefit of Netherlands Application No. NL 2012407, filed Mar. 11, 2014, and claims the benefit of U.S. Provisional Application No. 61/951,217, filed Mar. 11, 2014, the contents of all of which are incorporated by reference herein.

FIELD OF THE INVENTION

The present invention relates to a polyester and a method for the preparation of such a polyester. More in particular, the invention relates to a polyester that comprises 2,5-furandicarboxylate moieties and ethylene glycol residues and to a method for preparing such a polyester.

BACKGROUND OF THE INVENTION 2,5-Furandicarboxylic acid (FDCA) is a diacid that can be produced from natural sources such as carbohydrates. Routes for its preparation using air oxidation of 2,5-disubstituted furans such as 5-hydroxymethylfurfural or ethers thereof with catalysts comprising Co and Mn have been disclosed in e.g. WO2010/132740, WO2011/043660 and WO2011/043661.

U.S. Pat. No. 2,551,731 describes the preparation of polyesters and polyester-amides by reacting glycols with dicarboxylic acids of which at least one contains a heterocyclic ring, such as 2,5-FDCA. Under melt polymerization conditions, using sodium- and magnesium methoxide as a catalyst, FDCA and 2.5 equivalents of ethylene glycol or FDCA dimethyl ester and 1.6 equivalents of ethylene glycol were reacted in a esterification step or transesterification step, respectively, at ambient pressure between 160 and 220° C., after which a polycondensation was carried out between 190 and 220° C. under a few mm Hg pressure. The polycondensation process took between about 5 to over 7 hours. The product had a reported melting point of 205-210° C. and readily yielded filaments from the melt.

In US 2009/0124763 polyesters are described, having a 2,5-furandicarboxylate moiety within the polymer backbone and having a degree of polymerization of 185 or more and 600 or less. These polymers are made in a three step process involving the esterification of the 2,5-FDCA or the transesterification of the diester thereof with a diol, and a second step involving polycondensation, followed by solid state polymerization as third step.

The first step is carried out at ambient pressure at a temperature within a range of 150 to 180° C., whereas the polycondensation step is carried out under vacuum at a temperature within a range of 180 to 230° C. The product is then purified by dissolving the same in hexafluoroisopropanol, re-precipitation and drying, followed by the third step, a solid state polymerization at a temperature in the range of from 140 to 180° C. For the preparation of poly(ethylene furandicarboxylate) the first two steps took over 11 hours.

In WO 2010/077133 a process for preparing furandicarboxylate-containing polyesters is described wherein the diester of FDCA is transesterified with a diol, and the ester composition thus obtained is subjected to polycondensation. The polycondensation is conducted for a period of up to 5 hours. The polycondensate may then be subjected to solid state polymerization. In an example the solid state polymerization was conducted for 60 hours. Although the molecular weight of the polyester obtained is reasonably high, the duration of the solid state polymerization is considered too long. An improvement is described in WO 2013/062408, wherein the dimethyl ester of FDCA is transesterified with ethylene glycol, or bis(2-hydroxyethyl)-2,5-furandicarboxylate is used as starting material. The transesterification product or this starting material is then subjected to polycondensation and after a drying/crystallization step the polycondensate is subjected to solid state polymerization. The polycondensation was shown to take three hours. In an example the solid state polymerization takes two days.

In WO 2013/120989 a continuous process for the preparation of poly(ethylene furandicarboxylate) is described wherein FDCA or a diester thereof is mixed with ethylene glycol at elevated temperature to give a paste or a homogeneous solution, the paste or solution is converted to an esterification product of FDCA and ethylene glycol, the esterification product is polycondensed under reduced pressure, wherein the polycondensation is performed in two stages. According to an example the dimethyl ester of FDCA was reacted with ethylene glycol in a molar ratio of 1:1.7. In this example the stages following the production of the esterified product took 5 hours. The polycondensation product can be subjected, if desired, to a solid stating polymerization.

KR 20140003167 describes a polyester polymer with excellent transparency which is manufactured by using a biomass originated furandicarboxylate ester compound with ethylene glycol. In comparative examples also furandicarboxylic acid has been used. The molar ratio of furandicarboxylate ester to ethylene glycol may be from 1:1.1 to 1:4. The ratio of furandicarboxylic acid to ethylene glycol varies between 1:1.2 to 1:2. No indication is provided that specific measures have been taken to reduce the content of diethylene glycol in the resulting polyester.

In U.S. Pat. No. 8,420,769 polyesters are presented that have been prepared from FDCA or the diester thereof with a mixture of ethylene glycol and diethylene glycol. The amount of diethylene glycol is at least 50.1% mol with respect to the combination of ethylene glycol and diethylene glycol. The preparation process may take as long as 8.5 hours. The resulting polyester is stated to have improved impact strength. In a comparative experiment is has been shown that when no diethylene glycol is added as comonomer, the resulting polyester still shows small peaks in the $^1$H-NMR spectrum at shifts of about 4.2 and 4.8 ppm, indicating diethylene glycol moieties. From the peaks it can be deduced that the amount of diethylene glycol moieties is about 0.05 mol/mol, based on the amount of furandicarboxylate moieties.

This patent document confirms the finding by the Applicants that during the formation of the esterification product of FDCA and ethylene glycol, diethylene glycol is readily formed, which is subsequently built into the polyester that is obtained during the following polycondensation step and optional solid stating step.

Applicants have found that the incorporation of diethylene glycol moieties in the polyester reduces the melting point, reduces the glass transition temperature and crystallization level. Since the crystallization level is known to have an effect on the mechanical properties of the articles formed from such polyesters, it is believed that the incorporation of diethylene glycol moieties into the polyesters reduce the thermal stability and mechanical properties of such articles. When a polyester with a reduced content of diethylene glycol moieties is produced it has been found that the negative effects on the melting point, thermal stability and mechanical properties is reduced. Hence, contrary to what is being taught by U.S. Pat. No. 8,420,769 a thermally more stable polyester having improved mechanical properties can be produced by reducing the amount of diethylene glycol moieties instead of increasing this amount.

SUMMARY OF THE INVENTION

Accordingly, the present invention provides a polyester comprising ethylene 2,5-furandicarboxylate units, which polyester also comprises diethylene glycol residues, wherein the content of diethylene glycol residues is less than 0.045, in moles per mole of 2,5-furandicarboxylate moieties.

DETAILED DESCRIPTION OF THE INVENTION

The content of diethylene glycol residues in the polyester can be reduced by compounds that are capable of suppressing the formation of diethylene glycol from ethylene glycol. Accordingly, the invention further provides a method for the preparation of a polyester, wherein a starting mixture comprising 2,5-furandicarboxylic acid and ethylene glycol or comprising a dialkyl ester of 2,5-furandicarboxylic acid and ethylene glycol is subjected to esterification or transesterification to form an ester composition, which ester composition thus obtained is subjected to polycondensation at reduced pressure in the presence of a polycondensation catalyst to obtain a polycondensate, wherein the esterification or transesterification takes place in the presence of a basic compound and/or an ammonium compound capable of suppressing the formation of diethylene glycol. The method produces a polyester with a reduced amount of diethylene glycol moieties as in the above-described polyester.

Preferably, the content of diethylene glycol residues in the polyester according to the invention is less than 0.040 mol/mol, more preferably less than 0.030 mole/mole. Advantageously, the content of diethylene glycol is as low as possible. Preferably, the polyester does not contain any diethylene glycol residue. However, a level of diethylene glycol residues of 0.005 mole/mole may be acceptable, and may form a minimum level. The polyester according to the present invention suitably comprises 0.955 moles of ethylene moieties per mole furandicarboxylate moiety. More preferably, the polyester consists of poly(ethylene 2,5-furandicarboxylate) that further comprises diethylene glycol residues, wherein the amount of diethylene glycol residues amounts to at most 0.045 moles of diethylene glycol residues per mole of 2,5-furandicarboxylate.

The esterification or transesterification reaction takes place in the presence of an ammonium compound and/or a basic compound. Such compounds are known form the preparation of polyethylene terephthalate (PET). It has been found for the present invention that very suitably the basic or ammonium compound is selected from the group consisting of tetraalkyl ammonium compounds, choline, alkali metal salts of carboxylic acids, alkaline earth metal salts of carboxylic acids, basic alkali metal salts of mineral acids, alkali metal hydroxides, ammonium hydroxides, and combinations thereof. The alkyl groups in the tetraalkylammonium compounds have preferably 1 to 6, more preferably 1 to 4 carbon atoms. The alkyl groups may contain one or more substituents, suitably selected from a halogen atom, a hydroxyl group, a formyl group, a thiol group, a nitro group and combinations thereof. The carboxylic acids suitably have from 1 to 8 carbon atoms, one or more may be replaced by a heteroatom, such as an oxygen, sulfur or nitrogen atom. The carboxylic acid may be aliphatic, cycloaliphatic or aromatic. Suitable carboxylic acids include formic acid, acetic acid, propionic acid, but also furoic acid, benzoic acid, furandicarboxylic acid and combinations thereof. The basic salts of mineral acids suitably are derived from polybasic acids, such as sulfuric acid and phosphoric acid. Suitable examples of such basic alkali metal salts of mineral acids are $Na_2SO_4$ and $Na_2HPO_4$, $Na_2HPO_4$ being especially preferred. Advantageously, the tetraalkylammonium compound is selected from tetraalkylammonium hydroxide compounds, preferably from tetramethylammonium hydroxide, tetraethylammonium hydroxide and combinations thereof. Other suitable compounds comprise choline, tetraethylammonium hydroxide (TEAOH), tetramethylammonium hydroxide (TMAOH), tetrabutylammonium hydroxide, salts of carboxylic acids such as calcium or sodium acetate, alkali metal hydroxides, such as sodium hydroxide, or residual calcium or sodium in the FDCA.

The amounts of the basic or ammonium compounds can be selected from a wide range. Suitably the ranges are similar to those that are used in the preparation of PET. Such suitable amounts are from 0.01 to 1 mmol per mole furandicarboxylate, preferably from 0.02 to 0.5 mmol/mol and more preferably from 0.03 to 0.30 mmol per mole furandicarboxylate. Higher levels of these compounds may lead to discoloration during the polymerization The method of the present invention preferably employs a starting mixture comprising 2,5-furandicarboxylic acid and ethylene glycol. It has been found that this starting mixture, especially when the molar ratio between furandicarboxylic acid and ethylene glycol is in the range of 1:1.01-1.15, enables a more speedy formation of the polyester. Moreover, the use of such molar ratios with only a very low excess of ethylene glycol may lead to lower levels of diethylene glycol, compared to polyesters that have been prepared with the usual greater excesses, such as molar ratios of furandicarboxylic acid to ethylene glycol in the range of 1:1.5 to 1:3, such as 1:2. The polyester compositions according to the invention have therefore preferably been obtained from the polymerization of furandicarboxylic acid and ethylene glycol.

If the polyester is to be subjected to a solid state polymerization, the polyester preferably has a relative content of carboxylic acid end groups, expressed as the fraction of the molar amount of carboxylic acid end groups divided by the sum of the molar amounts of hydroxyl end groups and carboxylic acid end groups in the range of 0.10 to 0.7. It has been found that when solid particles of the polyester having such a content of carboxylic acid end groups, are subjected to solid state polymerization the duration of the solid state polymerization can be shortened considerably. If the polyester has already been subjected to a solid state polymerization then a lower content of carboxylic end groups may be preferred. An absolute level of 5 to 30 meq/kg may be suitable.

In general there are a number of methods to determine the end groups in polyesters. Such methods include titration, infrared and nuclear magnetic resonance (NMR) methods. Often the separate methods are used to quantify the four main end groups: carboxylic acid end groups, hydroxyl end groups, alkyl ester groups, such as the methyl ester end groups (for polyesters from the dialkyl ester of a dicarboxylic acid) and the end groups that are obtained after decarboxylation. A. T Jackson and D. F. Robertson have published an $^1$H-NMR method for end group determination in "Molecular Characterization and Analysis of Polymers" (J. M. Chalmers en R. J. Meier (eds.), Vol. 53 of "Comprehensive Analytical Chemistry", by B. Barcelo (ed.), (2008) Elsevier, on pages 171-203. In this method the hydroxyl end group is determined in polyethylene terephthalate (PET) by using a selection of harsh solvents such as 3-chlorophenol, 1,1,1,3,3,3-hexafluoro-2-propanol, trichloroacetic acid or trifluoroacetic acid. It is preferred to use deuterated 1,1,2, 2-tetrachloroethane (TCE-d2) as solvent without any derivatization of the polyester. A similar method can be carried out for polyesters that comprises furandicarboxylate moieties and ethylene glycol residues. The measurement of the end groups for the latter polyesters can be performed at room temperature without an undue risk of precipitation of the polyester from the solution. This $^1$H-NMR method using TCE-d2 is very suitable to determine the hydroxyl end groups (HEG), the decarboxylation and the content of diethylene glycol (DEG) groups. Peak assignments are set using the TCE peak at a chemical shift of 6.04 ppm. The furan peak at a chemical shift of 7.28 ppm is integrated and the integral is set at 2.000 for the two protons on the furan ring. The HEG is determined from the two methylene protons of the hydroxyl end group at 4.0 ppm. The content of DEG is determined from the integral of the shifts at 3.82 to 3.92 ppm, representing four protons. The decarboxylated end groups are found at a shift of 7.64-7.67 ppm, representing one proton. When the polyester also comprises methyl ester end groups, the methyl signal will occur at 3.97 ppm, representing 3 protons.

The carboxylic acid end groups are determined by using the titration method according to ASTM D7409, adapted for poly(ethylene 2,5-furandicarboxylate). A thus modified method thereof involves the titration of a 4% w/w solution of poly(ethylene 2,5-furandicarboxylate) in ortho-cresol with 0.01M KOH in ethanol as titrant to its equivalence point, using 0.5 mg of bromocresol green (2,6-dibromo-4-[7-(3,5-dibromo-4-hydroxy-2-methyl-phenyl)-9,9-dioxo-8-oxa-9λ6-thiabicyclo[4.3.0]nona-1,3,5-trien-7-yl]-3-methyl-phenol) in 0.1 ml ethanol as indicator.

For the purpose of the present application the values for HEG and the decarboxylated end groups are obtained by $^1$H-NMR using TCE-d2, whereas the values for CEG are determined by the titration method described above.

The molecular weight of the polyester according to the present invention is suitably expressed as an intrinsic viscosity. This molecular weight of such polyesters may be increased by subjecting the polyester of the present invention to solid state polymerization. Nevertheless, the polyester according to the present invention having relatively low molecular weight, e.g. of at least 0.45 dL/g, can be used for several purposes. Such purposes include the production of fibers, including those produced in melt spinning/drawing processes and those produced in melt-blown processes, the production of films or sheets for packaging and the like, the production of injection molded items, the production of bottles, or the production oriented tapes for strapping. The molecular weight of the present polyester is higher than the ester of the diol and FDCA with one or two furandicarboxylate groups. The molecular weight is expressed in terms of intrinsic viscosity. First the relative viscosity ($\eta_{rel}$) is determined in a 60/40 w/w mixture of phenol and tetrachloroethane at 30° C. and a concentration (c) of 0.4 g/dL. This procedure is similar to the ASTM D4603 standard for the determination of the inherent viscosity for poly(ethylene terephthalate). The intrinsic viscosity is then calculated using the Billmyer equation:

Intrinsic viscosity (IV)=$\{\eta_{rel}-1+3*\ln(\eta_{rel})\}/(4*c)$

The intrinsic viscosity is suitably greater than 0.45 dL/g and more preferably in the range of 0.45 to 1.0 dL/g. If the composition has undergone an additional step of solid stating then the molecular weight, as intrinsic viscosity, is preferably in the range of 0.65 to 1.2 dL/g, preferably to at least 0.75 dL/g, more preferably in the range of 0.75 dL/g to 1.0 dL/g. When the composition is to be used without an additional step of solid stating, the molecular weight is preferably in the range that is preferred for the desired end-use application, for example in the range of 0.65 to 1.0 dl/g, which is a suitable molecular weight for the end-use application of bottles.

The content of the various end groups can be expressed as relative to other end groups. As indicated above the relative content of carboxylic acid end groups is suitably in the range of 0.10 to 0.7 relative to the sum of hydroxyl and carboxylic acid end groups. More suitably, the relative content of carboxylic acid end groups is in the range of 0.14 to 0.65 based on the sum of the hydroxyl and carboxylic acid end groups. It is also possible to express the amount of end groups as an absolute value per weight unit of polyester. Expressed as an absolute feature, the amount of carboxylic acid end groups is advantageously in the range of 15 to 122 meq/kg, prior to any solid stating step. The absolute amount of carboxylic acid end groups (CEG) is directly obtained from titration. The determinations of the amounts of hydroxyl end groups (HEG), decarboxylated end groups (DecarbEG) and diethylene glycol (DEG) moieties are conducted as follows.

About 10 mg of a polyester is weighed and put in an 8 ml glass vial. To the vial 0.7 ml of TCE-d2 is added and the polyester is dissolved at room temperature whilst agitating the mixture in the vial. The dissolved mixture is subjected to $^1$H-NMR, whilst the peak for TCE-d2 is set at 6.04 ppm. The furan peak is centered at 7.28 ppm, and it is integrated and the integral set to 2.000, to represent the 2 protons on the furan ring. The $^1$H-NMR signals are integrated and the amounts of end groups are calculated as follows:

Hydroxyl end groups (HEG), meq/kg=5494*integral at 4.0 ppm/2;

Decarboxylated end groups (DecarbEG), meq/kg=5494*integral at 7.65 ppm.

When the polyester also comprises methyl ester end groups, the methyl signal will occur at 3.97 ppm and the content of the ester end groups is then calculated as:

Ester end groups (EEG), meq/kg=5494*integral at 3.97 ppm/3.

The DEG content, relative to the furandicarboxylate, can be determined from the integral at 3.82-3.92 ppm, divided by 2.

Whereas many prior art polyesters that contain furan dicarboxylate groups are grey, brown or yellow colored, the polyesters according to the present invention suitably have hardly any color. The color is expressed in terms of absorbance. The polyesters are suitably clear in that they have a light absorbance of at most 0.08, preferably at most 0.05, measured as a 30 mg/mL solution in a dichloromethane: hexafluoroisopropanol 8:2 (vol/vol) mixture at 400 nm.

The polyesters according to the present invention advantageously have a molecular weight expressed as intrinsic viscosity of at least 0.45 dl/g. The intrinsic viscosity is a measure closely linked to the weight average molecular weight Mw. The weight average molecular weight and the number average molecular weight can also be determined through the use of gel permeation chromatography (GPC). GPC measurements are suitably performed at 25° C. For the calculation polystyrene standards are used. As eluent suitably a solvent mixture of chloroform:2-chlorophenol 6:4 (vol/vol) can be used. In the experimental part GPC measurements were carried out under these conditions on a Merck-Hitachi LaChrom HPLC system equipped with two PLgel 5 μm MIXED-C (300×7.5 mm) columns. Calculation of the molecular weight was carried out by Cirrus™ PL DataStream software. When the weight average molecular weight Mw and number average molecular weight Mn would also be determined for the polyester according to present invention the polydispersity index (Mw/Mn) is suitably in the range of 1.9 to 2.6.

The polyester according to the present invention may be amorphous. Such an amorphous product is usually directly obtained from the polycondensation. However, the polyester according to the present invention is preferably semi crystalline. The crystallinity of a polymer tends to affect its physical properties, such as its density and melting temperature. Polymer crystallinity can be determined with Differential Scanning calorimetry (DSC) by quantifying the heat associated with melting of the polymer. The crystallinity is often expressed as net enthalpy of melting in terms of number of Joules per gram which number is derived from the DSC technique. The polyester according to the present invention preferably has a crystallinity of at least 25 J/g, measured by DSC. A maximum enthalpy in terms of number of Joules per gram is typically 80 J/g. The polyester according to the present invention having a certain degree of crystallinity then also has a melting point. The melting point of a polymer is easily determined by DSC and measured at the top of the endothermic peak. The ISO11357-3 standard describes such a melting determination. In accordance with this determination, the polyester according to the present invention suitably has a melting point of at least 215° C. In highly crystalline polyester the melting point may exceed 230° C., and even be as high as 245° C.

It is common that compositions comprising the polyester contain some moisture, especially as some moisture pick-up is common when the polymer is exposed to atmospheric air. Since the stability of the polyester composition according to the invention is improved when the polyester composition contains as little moisture as feasible, a composition comprising the polyester according to the present invention preferably has a moisture content of at most 100 ppmw, more preferably at most 50 ppmw, determined in accordance with ISO 15512.

When the present polyester has a carboxylic end group content of 0.10 to 0.70 and is subjected to solid state polymerization the polymerization rate during solid state polymerization is less dependent on the size of the polyester particles than for polyesters with a lower content of carboxylic acid end groups. This being the case, it allows the skilled person to select the most feasible particle size of the polyester in order to subject it to solid state polymerization. Suitably, the particle size is selected such that there are 40 to 350 particles per gram. Typically such a particle size boils down to polyester particles with a mass of 2.8 to 25 mg. Such particles can easily be handled and still provide a good polymerization rate when they are subjected to solid state polymerization. These particle sizes are also amenable to processing via air conveyance schemes and are suitably processed in existing driers, hoppers, and extrusion screws. Particles which are too small can lead to increased hazards due to dust and difficulty in processing due to an increased tendency to stick or "hang up" on various surfaces.

It has further been found that such a polyester can be prepared by deviating from the prior art methods for making similar polyesters. Generally speaking, many documents in the prior art with respect to furandicarboxylic acid based polyesters have prescribed to start from a diester of the diacid as the preferred starting material. For example, the use of dimethyl furandicarboxylate has been described. The polyester according to the present invention can be made from such a starting material. However, in such a case the content of carboxylic acid end groups will generally be low in such a preparation. If such a product is intended it may be possible to add water into the mixture of the diester and ethylene glycol. One way of achieving this may be done via the use of wet ethylene glycol. The added water may cause the saponification of some of the diesters, thereby yielding carboxylic acid groups. Another possibility is to use a mixture of FDCA and the diester thereof. Such a mixture may also be obtained by adding the FDCA diacid during the transesterification of the diester of FDCA with ethylene glycol to yield the ethylene diester of FDCA. In particular, addition of FDCA during the transesterification stage, more in particular towards the end of this stage, affords an opportunity to add acid end groups to the resulting polyester. In this way a number of carboxylic end groups are obtained that is in accordance with the polyester according to the preferred embodiment of present invention. It is also possible to use a mixture of water and ethylene glycol when starting from FDCA. This may be useful, for example, to improve the initial mixing of FDCA to form a slurry, without increasing the ethylene glycol content beyond the desirable range and thereby achieve a number of carboxylic end groups in accordance with the preferred polyester. It is also possible to add FDCA diacid late in the esterification period or during the pre-polycondensation period in order to adjust the number of carboxylic end groups such that the resultant polyester after melt polycondensation will have a number of carboxylic end groups in accordance with the polyester according to the preferred embodiment of the present invention.

It has been found that when the preparation of a polyethylene furandicarboxylate starts from the dimethylester of the diacid, the content of the carboxylic acid end group in the resulting polymer is less than about 10 meq/kg and also less than 0.1 when expressed as a fraction of the carboxylic acid end groups to the sum of the carboxylic acid end groups plus hydroxyl end groups. It has also been found that, whereas the prior art prescribes a significant excess of diol with regard to the furandicarboxylic acid, suitable polyesters are obtained if the excess of diol is rather small. The reduced excess of ethylene glycol has also as beneficial effect that a reduced amount of ethylene glycol is susceptible to diethylene glycol formation.

The polycondensate obtained from the polymerization from a starting mixture wherein the molar ratio of 2,5-furandicarboxylic acid to ethylene glycol is 1:1.01 to 1:1.15, comprises a higher content of carboxylic acid end groups than polycondensates that have been prepared from similar starting mixtures that contain a larger excess of ethylene glycol.

The esterification reaction of furan dicarboxylic acid and ethylene glycol is known in the art. Hence, the skilled person will realize that although there is no need for using an esterification catalyst, the use of such a catalyst may be contemplated. Hence in an embodiment the 2,5-furandicarboxyic acid and ethylene glycol are suitably reacted in the presence of an esterification catalyst. As esterification catalysts are advantageously acidic, and since one of the reactants is an acid, the necessity to use an esterification catalyst is lacking. However, when such a catalyst is used, it is suitably a Brønsted or Lewis acid. The Brønsted acids may be strong mineral acids such as sulphuric acid, nitric acid or hydrochloric acid. Suitable Lewis acids include compounds of metals such as the chlorides, bromides, tosylates, alkoxides and triflates of metal selected from the group consisting of, titanium, zinc, tin, calcium and mixtures thereof. It is also possible to use organic esters of the metal acids, such as the alkyl esters of titanic acid, stannic acid and the like. Hence, the esterification catalyst is preferably selected from catalysts containing one or more metals selected from the group consisting of titanium, tin, calcium and antimony. The catalysts, if used, may be added from the start of the esterification reaction. However, since the esterification proceeds easily without the use of an esterification catalyst, the esterification is preferably carried out in the absence of an esterification catalyst, which is dedicated to the esterification reaction.

In the esterification reaction water is being formed. It has been found that it is advantageous to remove the water formed during the reaction of 2,5-furandicarboxylic acid and ethylene glycol. In this way the esterification reaction being an equilibrium reaction, may be led to completion. The removal of water from the esterification mixture may be conducted in any known manner. It is suitable to pass any water formed in a vaporous phase through a condenser and remove the condensate that includes the liquefied water. The vaporous phase may comprise also some ethylene glycol. Therefore, the vaporous phase is advantageously passed through a distillation system wherein water and ethylene glycol are separated. The ethylene glycol is suitably, at least partly, but preferably substantially completely, recycled to the esterification mixture. The water thus separated is discharged. Hence, the method according to the present invention is preferably carried out such that water is removed in a distillation system wherein the majority of ethylene glycol that is removed with water is separated from water and at least partly recycled.

It will be evident that the degree with which the ethylene glycol is entrained in the vaporous phase of water formed is dependent on the temperature and other conditions at which the esterification is carried out. The conditions that are used in the prior art include a temperature in the range of about 180 to 280° C. and about ambient pressure. These conditions were maintained for a period of about 4 hours. In the method according to the present invention the esterification reaction between 2,5-furandicarboxylic acid and ethylene glycol is preferably carried out at a temperature of 160 to 240° C. The pressure is suitably in the range of 0.9 to 5 bar, and the reaction is advantageously continued for a period of 0.5 to 4 hr. The reaction is conveniently carried out in an inert atmosphere, such as under nitrogen, neon, helium or argon. The starting mixture may comprise a diluent, such as water, which is suitably discharged during the reaction.

The transesterification reaction is also well known. In that respect reference is made to WO 2010/077133 and WO 2013/120989, the contents of which are incorporated by reference.

When the esterification is being carried out in a batch process then it is possible to monitor the reaction progress by determining the amount of water which is produced, and comparing that to the stoichiometrically determined theoretical water amount at 100% esterification. When at least 70% of the theoretical amount of water has been removed, the esterification is stopped and the pressure is reduced to start a polycondensation stage. During the pressure reduction unreacted ethylene glycol is removed by vaporization from the reacting mixture. The exact timing for the end of esterification is determined by trials, and is dependent on the subsequent rate of pressure reduction and efficiency of water removal, but typically in batch processes the extent of water removal is suitably at least 70% and may be as high as virtually 100%. Preferably, the extent of water removal is in the range of 70 to 96%. The esterification stage should preferably not be continued beyond the point of 96% or the resulting product may be deficient in carboxylic acid end groups. If the esterification stage is continued for too short a period before the ethylene glycol removal has reached the lower limit, then the product will generally be too high in carboxylic acid end groups. If the esterification extent is carried out to less than 70%, i.e. less than 70% of the theoretical amount of water has been removed, for instance at 40%, so much ethylene glycol may volatize from the mixture during the pressure reduction that the resulting ester composition will be high in carboxylic end groups.

When the process is being conducted in a continuous manner then the esterification reaction progress will be controlled through the use of temperature, ethylene glycol feed ratio, and average residence time. The amount of water being removed from the system will again give an indication of the extent of the esterification reaction. Also in continuous processes the amount of water removed is controlled and the esterification reaction is prolonged until at least 70% of the stoichiometric amount of water, based on 100% esterification of FDCA feed has been removed. Reactors, equipment, and controls for the production of poly(ethylene terephthalate) such as described in the book Modern Polyesters: Chemistry and Technology of Polyesters and Copolyesters by J. Scheirs and T. E. Long (eds.), Wiley, 2003, can also be used to advantage for the production of the poly(ethylene 2,5-furandicarboxylate) polyesters of the present invention.

By the pressure reduction the excess amount of ethylene glycol is removed. In a batch process the pressure is reduced. In practice, the pressure reduction may take some time. The process of reducing the pressure may take from 0.1 to 1.8 hours. It is advantageous to slowly reduce the pressure in order to prevent the carry-over of the relatively low molecular weight esters into the vacuum system. Therefore, the ester composition passes through a stage wherein the pressure is in the range of 20 to 700 mbar. At this pressure a prepoly-condensation takes place. The eventual polycondensation occurs at a reduced pressure in the region of 0.05 to 20 mbar.

In case of a continuous process the temperature of the ester composition is suitably raised compared to the starting temperature of the esterification. Subsequently, the further heated ester composition is subjected to a pressure reduction. By the pressure reduction the composition is depleted of ethylene glycol. After the pressure reduction the product is maintained at the reduced pressure, and optionally, further heated so that a prepolycondensation stage takes place under evaporation of further ethylene glycol, yielding an oligomer of ethylene furandicarboxylate. This pre-polycondensation may take place in a continuous stirred tank reactor or a horizontal reactor operating with perforated rotating disks. The pressure at this pre-polycondensation reaction may be 20 to 700 mbar. For further pressure reduction the pre-polycondensation product may be passed to a further reactor where it is lead to further polycondensation. For such polycondensation reactions disc-type or cage-type reactors may be used. The pressure in the polycondensation reaction is suitable from 0.05 to 20, suitably from 0.05 to 5 mbar.

It has been found that the esterification reaction for 2,5-furandicarboxylic acid is quite fast and as a result it is most common to "over esterify" and leave an inadequate amount of carboxylic acid end groups in the polyester composition. The potential extent of the esterification reaction can be somewhat controlled by using a dimensionless parameter defined herein as:

$$\text{Esterification Potential (EsPo)} = (MR-1)^2 * P_{H2O}(T),$$

wherein MR represents the molar ratio of ethylene glycol over 2,5-furandicarboxylic acid, MR being greater than 1; $P_{H2O}(T)$ represents the pure component vapor pressure (in bar) of water at temperature T, which is the final reaction temperature in the esterification mixture before the pressure is reduced to enter the prepolycondensation stage. $P_{H2O}$ is determined in accordance with an established equation for the vapor pressure of pure water. The Antoine equation $$\log_{10} P = A - B/(C+T),$$

where T is the temperature at the end of esterification, expressed in ° C., A=5.2594, B=1810.94, and C=244.485 gives the required vapor pressure of pure water in bar. It has been found that the best results as to polycondensate are obtained if the esterification potential is at most 0.8, preferably from 0.05 to 0.5.

At this point the ester composition is subjected to a step of prepolycondensation. Thereto, the pressure is reduced and, optionally, a polycondensation catalyst is added. The prepolycondensation step is used to remove excess or unreacted ethylene glycol and to reduce the pressure to remove most of the other volatiles, while avoiding excessive foaming or carryover into the vacuum lines. The temperature is raised and the polycondensation reaction begins to occur, with liberation and removal of ethylene glycol which is generated via reaction. It is important to note that the esterification reaction also continues, generating water which is also removed from the reaction mixture. In very small batch equipment the same reactor may be used for all stages of the reaction. When the reaction is performed in larger scale batch equipment this stage may completed in the same equipment as the esterification reaction, and after this stage the reactant mixture may then be transferred to a vessel especially designed for good mass transfer to promote the polycondensation reaction. Alternatively, the reactant mixture may be moved to a different vessel prior to initiating the pressure let-down and the prepolycondensation and the polycondensation are then conducted in a single vessel. The addition of polycondensation catalyst may already have occurred at the start of the esterification reaction, so that no further addition of the catalyst to the esterification product is desired at this point.

Other compounds, such as stabilizing agents, may also be added to the esterification product. The stabilizing agents may include antioxidants. Preferred antioxidants are phosphite-containing compounds, phosphate compounds, phosphonate compounds, and hindered phenolic compounds. Antioxidants include such compounds as trialkyl phosphites, mixed alkyl/aryl phosphites, alkylated aryl phosphites, sterically hindered aryl phosphites, aliphatic spirocyclic phosphites, alkyl phosphates, aryl phosphates, mixed alkyl/aryl phosphates, alkyl phosphonoacetates, sterically hindered phenyl spirocyclics, sterically hindered bisphosphonites, hydroxyphenyl propionates, hydroxy benzyls, alkyl phenols, aromatic amines, hindered amines, hydroquinones and mixtures thereof. Such other compounds may also be added in batch or any other type of operation.

Hence the compositions comprising the polyester according to the invention may comprise such compounds.

Poly(ethylene 2,5-furandicarboxylate) is a slowly crystallizing polyester under quiescent conditions. Nucleating agents may be added to the polyester composition to increase the nucleation density, and thereby increase the overall crystallization rate under quiescent conditions.

For crystallization of the polyester according to the present invention, typically prior to an SSP process, crystallization may be conducted from the melt (as may be done in an underwater pelletizer with in-situ crystallization) or from the glassy state (after cooling of polymer granulates). To this end it may be desirable to add a nucleating agent to the polyester after the polycondensation, typically still in the melt phase. Typical addition levels will be from 0.05-2 wt %, or more preferably 0.1 to 1 wt %, based on the total polyester. The inorganic minerals may be added at higher levels, such as up to 5 or even 10 wt % if desired.

Nucleating agents may include inorganic minerals, organic salts, high melting waxes, or other polymers. Examples of inorganic minerals include talc, titanium dioxide, fused silica, boron nitride, mica, and calcium carbonate. Some examples of the organic salts sodium stearate, zinc stearate, other stearate salts, salts of other fatty acids, FDCA disodium salt, sodium salt of saccharine, salts of benzoic acid, aromatic phosphonates, sulfonic acid ester salts of isophthalic acid, and commercial materials such as bis(4-propylbenzylidene) propyl sorbitol, available as Millad®NX88 from Milliken Chemicals and 3,4-Dimethylbenzylidene sorbitol, available as Millad®3988, phosphate salts and esters, available as NA-11, methylen-bis(4,6-di-t-butylphenyl)phosphate sodium salt, or NA-21, aluminium-hydroxy-bis[2,2"-methylene-bis(4,6-di-t-butyl-phenyl)-phosphate. High melting waxes include materials such as stearamides and erucamides, or bis-amides. Polymers can include materials such as ionomers e.g. Surlyn ionomers from Du Pont, Aculyn ionomers from Rohm and Haas, PEG2000 (polyethylene glycol), PET, PBT or others. Polymer crystallization can be conducted for a number of reasons, each of which would then be performed under different conditions. For example, to create a semi-crystalline part in an injection molding machine it would be required to have a rapid crystallization of the polymer during cooling from the melt. On the other hand, for crystallization of material prior to drying of reclaimed scrap, it would be desired to have the polymer crystallize rapidly from the glassy state, or on the up-heat.

In a more continuous operation the prepolycondensation reaction may be conducted in a dedicated vessel, typically with the overhead vapors being collected separately from the vapors generated during the esterification stage. During this process stage the pressure is typically reduced from approximately 1 bar or more used during esterification down to about 20 to 700 mbar, and more preferably to about 20 to 100 mbar. The duration of the prepolycondensation is suitably in the range of 0.5 to 2 hours.

At this point the ester composition is subjected to a step of polycondensation. As is known from the prior art the pressure at this step is further reduced. Pressures of less than about 5 mbar and preferably less than about 3 mbar may be applied. Lower pressures are preferred for good mass transfer and removal of ethylene glycol and water being liberated in the polycondensation and esterification reactions, respectively. Polycondensation temperatures according to the prior art are about 180 to 280° C. The polycondensation according to the invention is preferably carried out at a temperature of 245 to 270° C. and suitably at a pressure of 0.05 to 5 mbar. Under these conditions it is ensured that the ester composition as well as the polycondensate formed is in a molten stage. The polycondensation is suitably continued for a period ranging from 1 to 3 hours. Preferably, the combined period for the prepolycondensation and the polycondensation stages is in the range of 1.5 to 4 hours.

The polycondensation may be terminated when the desired intrinsic viscosity has been reached. This can be monitored by measuring the torque of a stirrer that is provided in the reactor wherein the polycondensation is being carried out. It can also be monitored, for example, by a melt viscometer at the outlet of the reactor in a continuous process arrangement. When the viscosity is sufficiently high, the polycondensation is stopped and the product is discharged, yielding the polycondensate.

As indicated above, the polycondensation is preferably carried out in the presence of a polycondensation catalyst. Many polycondensation catalysts may be used. Such catalysts include the catalysts comprising one or more elements selected from tin, titanium, zinc, antimony, calcium, manganese, cobalt, hafnium, lead, magnesium, aluminium, cerium, zirconium and mixtures thereof. These compounds may be the acetate or carbonate salts of these metals. Alternatively, metal alkoxides, alkyl metal compounds, or other organometallic compounds are also possible. Other suitable catalysts include the oxides and halides of the elements mentioned. Preferred catalysts include titanium alkoxides, antimony acetate, antimony oxide, and antimony glycolate, i.e. the reaction product of antimony oxide and ethylene glycol. The amounts of the polycondensation catalyst are typically in the range of 0.005 mol % to 0.2 mol %, based on the number of moles of 2,5-furandicarboxylic acid in the starting mixture, preferably in the range of 0.01 to 0.10 mol %.

The polycondensation catalysts may be added to the ester composition when the ester composition has been formed. It is also possible to add the polycondensation catalyst to the starting mixture of 2,5-furandicarboxylic acid and ethylene glycol, optionally in the presence of an esterification catalyst. The esterification catalyst, if present, is suitably present in an amount of 0.005 mol % to 0.2 mol %, based on the number of moles of 2,5-furandicarboxylic acid. When the polycondensation catalyst is added in the starting mixture or at an intermediate point of the esterification process the ester composition formed is suitably not isolated. In a batch process, after forming of the ester composition, the resulting product is preferably kept in the reaction zone where the esterification took place and the product as such is subjected to a pressure reduction in the prepolycondensation step. In a continuous process, after forming of the ester composition, the resulting product is transported to the next reaction vessel and subjected to a pressure reduction to accomplish evaporation of the ethylene glycol excess to start the prepolycondensation step.

When the viscosity is sufficiently high, the polycondensation is stopped and the product is discharged, yielding the polycondensate. The discharging operation can take various forms, depending on the nature of the polycondensation process. For example, if the polycondensation is conducted batch-wise, then the discharge may advantageously be conducted by closing off the vacuum and pressuring the reaction vessel with nitrogen or other inert gas. It can also be discharged through the use of gear pumps, either under pressure or under vacuum. If the polycondensation is conducted in a continuous manner then the discharge is also advantageously conducted in a continuous manner, for example, through the use of gear pumps to remove the polycondensate from the reaction vessel.

The polycondensate can be further processed even in the melt form. For example, it can be directed via pumps and or extruders through a melt filtration apparatus to a spinneret assembly, where it is directly formed into melt-spun fibers and subjected to drawing operations to form a filament bundle and subjected to optional further operations to form a multifilament yarn. It could instead be passed through a die to form a sheet and cooled over a series of rollers to make sheet or film, suitable for example for use in thermoforming operations. It has been found that it is very advantageous to treat the polycondensate melt thus obtained to a pelletizing step, such that solid particles are obtained. Thereto, the melt may be passed through a die yielding strands which are cooled in water and that are then cut into small particles. Such particles are typically of uniform size and cylindrical in shape. The melt may also be subjected to a process known as "under water pelletization" or "die face cutting", wherein the melt is passed through a die, with a multitude of holes, which is in contact on one side with a cooling medium, such as water, and a rotating hub of cutters is used to cut the emerging melt to form pellets. Such particles are typically of uniform size and nearly spherical. Other methods can also be used. As an example, solid chips of polycondensate may be ground to small particles. The particles are suitably such that the average number of particles per gram is in the range of 40 to 350 particles per gram. Typically such a particle size boils down to polyester particles with a mass of 2.8 to 25 mg per particle. It has been found that when the polycondensation step is carried out to obtain a polycondensate with an intrinsic viscosity of greater than 0.45, and more preferably greater than 0.50, e.g. greater than about 0.52 dl/g, the step of converting the polycondensate melt into particles is more efficient, with fewer process upsets due to strand breaks and with a more even distribution of particle sizes and with less dust or fines. This is desirable for further processing of the polycondensate particles.

When the polycondensate is recovered as solid material from the polycondensation step, the polycondensate is rather amorphous. In order to render the polycondensate into a more crystalline material, the polycondensate is preferably crystallized at a temperature in the range of 90 to 200° C. Thereto, the polycondensate is subjected to a heating step, whilst still in a solid state, at the temperature indicated. In certain arrangements the heating step may entail controlling the temperature of the pellet during pelletization such that the final pellet temperature is in a range where crystallization occurs. Prior to any step of additional heating any adhered water from the pelletizing step is removed. This procedure is suitably carried out by bringing the temperature of the polycondensate to the desired temperature in the range of 90 to 200° C. For poly(ethylene 2,5-furandicarboxylate) it has been found that the most rapid crystallization occurs at approximately 170° C. It has also been found that if the particles are held for approximately 1 hour at 90 to 120° C. the subsequent crystallization at 170° C. is faster. The heating step can suitably be conducted at atmospheric pressure or under vacuum. The heat can suitably be provided by a water bath. The optimal temperature program will depend on the particular arrangements used for the crystallization. Typically, the polycondensate is kept a temperature in the range of 90 to 140° C. for a period of 0.2 to 2.5 hrs, followed by a crystallization step for 1 to 48 hours at a temperature in the range of 120 to 200° C. It has been found that the polyester chains in the polycondensate crystallize under these conditions yielding a semi-crystalline polyester. The polyester thus obtained suitably has a crystallinity of at least 25 J/g, measured by DSC. It suitably has a melting point of at least 215° C. The polycondensate also has a relative content of carboxylic acid end groups, expressed as the fraction of the molar amount of carboxylic acid end groups divided by the sum of the molar amounts of hydroxyl end groups and carboxylic acid end groups in the range of 0.10 to 0.7.

According to the present invention an underwater pelletizing system can be used that produces pellets of the polymer according to the invention in a hot enough condition to self-initiate the crystallization process therein and ultimately provide a sufficiently crystalline character such that the polyester pellets obtained do not require a separate heating step in order to undergo crystallization. This elevated heat condition may be accomplished by reducing the residence time of the pellets in the water slurry in order to leave enough heat in the polyester pellets during the drying stage so that the crystallization process is initiated from inside the pellets. To do this, it is desired to separate the pellets from the water as soon as possible and to significantly increase the speed of pellet flow from the exit of the underwater pelletizer and into and through a dryer. The hot pellets leaving the dryer can then be carried on a conventional vibrating conveyor or other vibrating or handling equipment for a time sufficient to achieve the desired crystallinity and avoid agglomeration. The hot pellets can also be stored in a heat retaining condition, such as in a heat insulating container, to complete the desired crystallization process. For example, coated steel or plastic containers may be acceptable or stainless steel boxes that are conventionally used for polyethylene terephthalate. This system is similar to the one described for polyethylene terephthalate in U.S. Pat. No. 8,366,428.

The polycondensate may be subjected to a subsequent solid stating step. Such a step suitably takes place at a temperature in the range of 180° C. to 210° C., but in all cases below the melting point of the polycondensate. The pressure may be elevated, but is suitably ambient with an inert gas flow or may be below atmospheric pressure, such as below 100 mbar. The solid stating step may be carried out for a period up to 120 hr, suitably in the range of 2 to 60 hr, as may be needed to reach the final desired molecular weight.

The present invention will be further illustrated by means of the following examples.

EXAMPLES

In the following examples the amounts of hydroxyl end groups (HEG) and diethylene glycol residues (DEG) were determined by $^1$H-NMR using the procedure as described in the description above. In the experiments $^1$H (Inverse Gated Decoupled) nuclear magnetic resonance (NMR) spectra were recorded on a Bruker Avance 500 digital NMR with Cryo Platform using the residual solvent as internal standard. The NMR analysis was made within a few hours after the sample had been prepared. The carboxylic end group content was determined by titration.

The results of these determinations are amounts of the respective end groups expressed in meq/kg. For the relative content of carboxylic acid end groups based on the sum of the carboxylic acid end groups and hydroxyl end groups the following formula is used: CEG/(CEG+HEG).

Example 1

Experiments were conducted concerning the effect of tetraethylammonium hydroxide (TEAOH) and tetramethylammonium hydroxide (TMAOH) on the formation of DEG during the polymerization of FDCA with ethylene glycol. A 10 g charge of FDCA was used for each experiment. The feed ratio of ethylene glycol to FDCA was approximately 1.3/1 (mixing is poor at lower ratios, but the experiment still demonstrates efficacy of TEAOH and TMAOH). Catalyst was antimony, at a mole ratio of 0.04 mol % based on FDCA. Esterification was conducted at 220° C. and times of 90 to 160 minutes as needed to substantially complete esterification. The pressure was reduced and polycondensation was conducted at temperatures from 240-260° C. for 90-120 minutes. Table 1 below shows the level of addition and the resulting level of DEG in the product.

TABLE 1

| Addition level, ppm (wt) [number of runs] | Addition, (mmol/mol FDCA) | DEG content, mol/mol |
| --- | --- | --- |
| 0 [n = 3] | 0 | 0.048 |
| 120 ppm TEAOH [n = 2] | 0.13 | 0.041 |
| 135 ppm TEAOH [n = 2] | 0.14 | 0.038 |
| 270 ppm TEAOH [n = 4] | 0.29 | 0.033 |
| 450 ppm TEAOH [n = 2] | 0.48 | 0.028 |
| 43 ppm TMAOH [n = 1] | 0.07 | 0.041 |
| 86 ppm TMAOH [n = 2] | 0.15 | 0.036 |
| 172 ppm TMAOH [n = 4] | 0.29 | 0.031 |

Example 2

A number of polymerizations were carried out to show the preparation of polyester according to the present invention.

Ethylene glycol (MEG) and 2,5-furandicarboxylic acid (FDCA) were mixed in an MEG:FDCA molar ratio of 1.15 or 1.30, along with $Sb_2O_3$ as a catalyst, present at 314 ppm of antimony. The reaction mixtures in experiments 1 and 3 further contained 42 ppm TEAOH (0.04 mmol/mol MEG) and the reaction mixture in experiment 2 contained 80 ppm (0.09 mmol/mol) of TEAOH. The mixtures were subjected to esterification without addition of an esterification catalyst for a period of time ($t_e$) at elevated temperature. Water that was formed was evaporated and passed into a distillation column. The condensed water was removed and any MEG that was entrained or evaporated was recycled back to the reaction mixture. The reaction was continued at atmospheric pressure until 85% of the theoretical water, based on furandicarboxylic acid feed, was collected. The temperature at that time was 240° C. and the reaction time was 270 minutes. The pressure was reduced, and pre-polycondensation was started, the pressure reaching 20 mbar in approximately 70 minutes. The vacuum take-off point was switched at this point so that any additional ethylene glycol could be removed without passing through the distillation column. The pressure was further reduced to below 5 mbar. The ester composition with the catalyst was subjected to a polycondensation at a temperature of 245 or 251° C., as indicated in Table 2. The polycondensation was continued for a period $t_p$ until the intrinsic viscosity (IV) was about 0.5 dl/g. The polycondensation rate (P rate) was calculated as the rate of IV increase (*1000) in dl/g per minute. The relative CEG was determined as CEG/(CEG+HEG), CEG and HEG being expressed in meq/kg. The diethylene glycol content (DEG) is expressed in moles per mole furandicarboxylate, determined with $^1$H NMR. The reaction conditions and the results are shown in Table 2.

TABLE 2

| Exp. No. | MEG/ FDCA | Esterification T, °C. | $t_e$, min | $P_{H2O}$, bar | EsPo | Polycondens. T, °C. | $T_p$, min | P rate | HEG | CEG | Rel. CEG | DEG, |
|---|---|---|---|---|---|---|---|---|---|---|---|---|
| 1 | 1.15 | 241 | 270 | 33.8 | 0.76 | 245 | 160 | 5.18 | 121 | 19 | 0.14 | 0.036 |
| 2 | 1.15 | 241 | 270 | 33.8 | 0.76 | 245 | 170 | 4.88 | 130 | 16 | 0.11 | 0.040 |
| 3 | 1.30 | 244 | 268 | 35.7 | 3.21 | 251 | 270 | 2.61 | 120 | 6 | 0.05 | 0.041 |

The results show that the use of TEAOH results in polyesters with a DEG content below 0.045 mol/mol. Comparison of the results of Experiment Nos. 1 and 3 also shows that at increased excess of ethylene glycol in the starting mixture the level of DEG residues in the resulting polyester also increases.

Example 3

The procedure of Example 2 was repeated with different MEG/FDCA ratios and different temperatures. Each reaction mixture also included 80 ppm of TEAOH (0.09 mmol/mol MEG). The polycondensation reactions were continued until a somewhat higher IV was obtained than in Example 2. The relative CEG was determined as CEG/(CEG+HEG). The DEG content was also determined. The conditions and results are shown in Table 3.

TABLE 3

| Exp No. | MEG/ FDCA | Esterification T, °C. | $t_e$, min | EsPo | Polycondens. T, °C. | $T_p$, min | IV, dl/g | P rate | rel. CEG | HEG, meq/kg | CEG, meq/kg | DEG, mol/mol |
|---|---|---|---|---|---|---|---|---|---|---|---|---|
| 4 | 1.18 | 225 | 157 | 0.82 | 261 | 147 | 0.41 | 2.77 | 0.10 | 142 | 16 | 0.041 |
| 5 | 1.12 | 216 | 150 | 0.31 | 262 | 179 | 0.59 | 3.28 | 0.23 | 62 | 19 | 0.040 |
| 6 | 1.11 | 213 | 140 | 0.24 | 261 | 140 | 0.61 | 4.35 | 0.54 | 35 | 35 | 0.040 |
| 7 | 1.12 | 214 | 175 | 0.29 | 261 | 150 | 0.61 | 4.06 | 0.30 | 59 | 25 | 0.041 |

The results show that at different esterification and polycondensation temperatures or at varying ratios of starting material the formation of diethylene glycol can be suppressed by the addition of TEAOH.

The absorbance properties of the polyesters of experiments 6 and 7 were determined and found to be 0.023 and 0.035, respectively, measured as a 30 mg/mL solution in a dichloromethane:hexafluoroisopropanol 8:2 (vol/vol) mixture at 400 nm.

Example 4

Samples of poly(ethylene 2,5-furandicarboxylate) with varying levels of DEG were prepared. In a first series of runs, samples were placed into DSC pans and subjected to an initial stage of melting, followed by isothermal crystallization from the melt at 170° C. for 73 minutes. The melting point (Tm) of the resulting semi-crystalline polyesters were then determined by DSC. The resulting melting points are shown in the Table 4 below. In a second series of runs two of the same polymers were treated by isothermal crystallization from the melt at 170° C. for 1 hour, followed by an additional annealing step of 1 hour of isothermal heating at 195° C. or 205° C. After annealing, the polymers were tested by DSC to determine the peak melting temperature and the net crystallinity (expressed as net enthalpy (Hm) in J/g). These results are also shown in Table 4 below.

TABLE 4

| Sample | DEG mol/mol | 170° C. anneal, Tm (° C.) | Additional anneal at 195° C. Tm (° C.) | Additional anneal at 195° C. Hm (J/g) | Additional anneal at 205° C. Tm (° C.) | Additional anneal at 205° C. Hm (J/g) |
|---|---|---|---|---|---|---|
| 1 | 0.025 | 210.2 | 215.5 | 50 | 222 | 51 |
| 2 | 0.043 | 206.1 | 210.4 | 46 | 221 | 40 |
| 3 | 0.058 | 204.3 | 216.2 | 45 | 221 | 21 |
| 4 | 0.107 | 197.0 | 205.1 | 2 | Melted | 0 |

These data show the negative impact of increased DEG levels leading to reduced melting point and reduced extent of crystallization. When attempting to anneal at higher temperatures, such as 195° C. or 205° C., in order to increase the melting point, the higher DEG content samples actually melted instead of increasing the crystallinity. Samples with lower levels of DEG had higher Tm and increased levels of crystallinity as measured by Hm. The glass transition temperature of the higher DEG content samples was also reduced, relative to the samples with lower DEG content. This can have an adverse effect on thermal stability and mechanical properties of formed articles.

Example 5

Experiments were conducted on the effect of $Na_2SO_4$ and $Na_2HPO_4$ on the formation of DEG during the polymerization of FDCA with ethylene glycol. A 10 g charge of FDCA was used for each experiment. The feed ratio of ethylene glycol to FDCA was approximately 1.25/1. Catalyst was antimony, at a mole ratio of 0.03 mol % based on FDCA. Esterification was conducted at 220° C. and times of 155 to 165 minutes as needed to substantially complete esterification. The pressure was reduced and polycondensation was conducted at temperature of 245° C. for 90 minutes. Table 5 below shows the level of addition and the resulting level of DEG in the product.

TABLE 5

| Addition level, ppm (wt) | Addition, (mmol/mol FDCA) | DEG content, mol/mol |
|---|---|---|
| No catalyst, no additive | 0 | 0.088 |
| 160 ppm Na$_2$HPO$_4$ | 0.14 | 0.038 |
| 320 ppm Na$_2$HPO$_4$ | 0.28 | 0.033 |
| 640 ppm Na$_2$SO$_4$ | 0.70 | 0.041 |

The invention claimed is:

1. A polyester comprising ethylene 2,5-furandicarboxylate moieties, which polyester also comprises diethylene glycol residues, wherein the content of diethylene glycol residues is less than 0.045, in moles per mole of 2,5-furandicarboxylate moieties.

2. The polyester according to claim 1, which has a relative content of carboxylic acid end groups, expressed as the fraction of the molar amount of carboxylic acid end groups divided by the sum of the molar amounts of hydroxyl end groups and carboxylic acid end groups in the range of 0.10 to 0.70.

3. The polyester according to claim 2, wherein the relative content of carboxylic acid end groups is in the range of 0.14 to 0.65.

4. The polyester according to claim 1, wherein the amount of carboxylic acid end groups is in the range of 15 to 122 meq/kg.

5. The polyester according to claim 1, which has an intrinsic viscosity of at least 0.45 dL/g.

6. The polyester according to claim 1, which has a light absorbance of at most 0.08, measured as a 30 mg/mL solution in a dichloromethane:hexafluoroisopropanol 8:2 (vol/vol) mixture at 400 nm.

7. The polyester according to claim 1, which has a polydispersity index in the range of 1.9 to 2.6.

8. The polyester according to claim 1, which has a crystallinity of at least 25 J/g, measured by Differential Scanning calorimetry (DSC).

9. The polyester according to claim 1, which has a melting point of at least 215° C.

10. A composition comprising the polyester according claim 1, which has a moisture content of at most 100 ppmw, determined in accordance with ISO 15512.

11. A method for the preparation of a polyester comprising ethylene 2,5-furandicarboxylate moieties, which polyester also comprises diethylene glycol residues, wherein a starting mixture comprising 2,5-furandicarboxylic acid and ethylene glycol or comprising a dialkyl ester of 2,5-furandicarboxylic acid and ethylene glycol is subjected to esterification or transesterifiaction to form an ester composition, which ester composition thus obtained is subjected to polycondensation at reduced pressure in the presence of a polycondensation catalyst to obtain a polycondensate, wherein the esterification or transesterification takes place in the presence of a basic compound and/or an ammonium compound capable of suppressing the formation of diethylene glycol, whereby the content in said polyester of diethylene glycol residues is less than 0.045, in moles per mole of 2,5-furandicarboxylate moieties.

12. The method according to claim 11, wherein the basic or ammonium compound is selected from the group consisting of tetraalkyl ammonium compounds, choline, alkali metal salts of carboxylic acids, alkaline earth metal salts of carboxylic acids, basic alkali metal salts of mineral acids, basic alkaline earth metal salts of mineral acids, alkali metal hydroxides, ammonium hydroxides and combinations thereof.

13. The method according to claim 12, wherein the tetraalkylammonium compound is selected from tetraalkylammonium hydroxide compounds, and the basic alkali metal salt of mineral acid is Na$_2$HPO$_4$.

14. The method according to claim 11, wherein the starting mixture comprises 2,5-furandicarboxylic acid and ethylene glycol.

15. The method according to claim 14, wherein the esterification reaction between 2,5-furandicarboxylic acid and ethylene glycol is carried out at a temperature of 160 to 240° C. and a pressure of 0.9 to 5 bar for a period of 0.5 to 4 hr.

16. The method according to claim 11, wherein the polycondensation comprises a pre-polycondensation reaction conducted at a pressure of 20 to 700 mbar and a polycondensation reaction conducted at 0.05 to 20 mbar.

17. The method according to claim 16, wherein the combined period for the pre-polycondensation and the polycondensation reactions is in the range of 1.5 to 5 hours.

18. The method according to claim 11, wherein during the polycondensation step ethylene glycol that is formed is removed from the ester composition that is subjected to polycondensation.

19. The method according to claim 11, wherein the polycondensation catalyst is selected from the catalysts comprising one or more elements selected from tin, zinc, titanium and antimony.

20. The method according to claim 10, wherein the polycondensation is carried out at a temperature of 245 to 270° C. and a pressure of 0.05 to 5 mbar.

21. The method according to claim 10, wherein the polycondensate is crystallized at a temperature in the range of 90 to 200° C.

22. The method according to claim 11, which further comprises a step of solid state polymerization.

23. The method according to claim 22, wherein the solid state polymerization is carried out at a temperature in the range of 180° C. to 210° C.

24. The method according to claim 22, which is carried out for a period up to 120 hr.

25. Polyester according to claim 1, wherein the content of diethylene glycol residues is less than 0.040, in moles per mole of 2,5-furandicarboxylate moieties.

26. Polyester according to claim 1, wherein the content of diethylene glycol residues is less than 0.030, in moles per mole of 2,5-furandicarboxylate moieties.

* * * * *